(12) United States Patent
Yahashi et al.

(10) Patent No.: US 10,107,454 B2
(45) Date of Patent: Oct. 23, 2018

(54) GAS SUPPLY SYSTEM AND CORRECTION METHOD

(75) Inventors: Hiroki Yahashi, Toyota (JP); Tsukuo Ishitoya, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 343 days.

(21) Appl. No.: 13/817,406

(22) PCT Filed: Aug. 10, 2011

(86) PCT No.: PCT/IB2011/001841
§ 371 (c)(1),
(2), (4) Date: Feb. 15, 2013

(87) PCT Pub. No.: WO2012/023015
PCT Pub. Date: Feb. 23, 2012

(65) Prior Publication Data
US 2013/0146176 A1   Jun. 13, 2013

(30) Foreign Application Priority Data
Aug. 20, 2010   (JP) ................................. 2010-184813

(51) Int. Cl.
*F17C 5/00* (2006.01)
*F17C 5/06* (2006.01)

(52) U.S. Cl.
CPC ................ *F17C 5/00* (2013.01); *F17C 5/007* (2013.01); *F17C 5/06* (2013.01);
(Continued)

(58) Field of Classification Search
CPC .... F17C 5/00; F17C 5/007; F17C 5/06; F17C 2223/0123; F17C 2250/0443;
(Continued)

(56) References Cited

U.S. PATENT DOCUMENTS 5,098,060 A    3/1992   Mogler
5,479,966 A *  1/1996   Tison ....................... F17C 5/06
                                                           141/12
(Continued)

FOREIGN PATENT DOCUMENTS

CN    1856700 A    11/2006
DE    40 19 889     1/1992
(Continued)

*Primary Examiner* — Jason K Niesz
*Assistant Examiner* — James Hakomaki
(74) *Attorney, Agent, or Firm* — Hunton Andrews Kurth LLP

(57) ABSTRACT

In a gas supply system, a control portion acquires a first temperature and a first pressure of a gas in a fuel tank, and a first output signal value of a pressure sensor corresponding to the first pressure before gas supply, acquires a first amount of the gas in the fuel tank using a fuel tank volume, the first temperature, and the first pressure, acquires a second amount after gas supply, through integration of a measurement value obtained by a flowmeter during gas supply, acquires a second temperature, a second pressure, and a second output signal value corresponding to the second pressure after gas supply, calculates a third pressure using the fuel tank volume, the second amount, and the second temperature, and corrects a relationship between an output signal and the pressure using the first pressure, the first output signal value, the third pressure, and the second output signal value.

5 Claims, 8 Drawing Sheets

(52) U.S. Cl.
CPC .............. *F17C 2205/0326* (2013.01); *F17C 2205/0338* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2250/032* (2013.01); *F17C 2250/034* (2013.01); *F17C 2250/043* (2013.01); *F17C 2250/0439* (2013.01); *F17C 2250/0443* (2013.01); *F17C 2250/0694* (2013.01); *F17C 2260/024* (2013.01); *F17C 2265/065* (2013.01); *F17C 2265/066* (2013.01); *F17C 2270/0139* (2013.01); *F17C 2270/0168* (2013.01); *F17C 2270/0184* (2013.01); *Y02E 60/321* (2013.01)

(58) Field of Classification Search
CPC ........ F17C 2270/0139; F17C 2250/034; F17C 2260/024; F17C 2205/0326; F17C 2205/0338; F17C 2250/0439; F17C 2250/043; F17C 2250/0694; F17C 2265/066; F17C 2223/036; F17C 2265/065; F17C 2225/036; F17C 2270/0168; F17C 2250/032; F17C 2221/012; F17C 2225/0123; F17C 2270/0184; B67D 1/1238; B67C 11/02; G05D 9/12; B60S 5/046; Y02E 60/321
USPC ................ 141/95, 4, 94, 197, 39, 83; 222/3; 702/144, 50, 96, 98, 6, 7
See application file for complete search history.

(56) References Cited

U.S. PATENT DOCUMENTS

| | | | |
|---|---|---|---|
| 5,520,969 A * | 5/1996 | Nishizato et al. | 427/8 |
| 5,665,895 A * | 9/1997 | Hart | G01F 1/007 702/100 |
| 5,771,948 A | 6/1998 | Kountz et al. | |
| 5,868,176 A | 2/1999 | Barajas | |
| 6,122,577 A * | 9/2000 | Mergenthaler et al. | 701/30.2 |
| 6,581,574 B1 * | 6/2003 | Moran et al. | 123/497 |
| 6,595,067 B2 * | 7/2003 | Suzuki et al. | 73/754 |
| 6,672,340 B2 * | 1/2004 | Mutter | 141/4 |
| 6,960,487 B2 * | 11/2005 | Suzuki et al. | 438/51 |
| 7,025,050 B2 * | 4/2006 | Oono et al. | 123/690 |
| 7,210,341 B2 * | 5/2007 | Fuse | G01F 15/0755 73/149 |
| 7,270,116 B2 * | 9/2007 | Pauli et al. | 123/480 |
| 7,295,934 B2 * | 11/2007 | Hairston | 702/45 |
| 7,472,690 B2 * | 1/2009 | Takayanagi et al. | 123/446 |
| 8,412,440 B2 * | 4/2013 | Kaneko et al. | 701/103 |
| 2002/0053365 A1 | 5/2002 | Mutter | |
| 2003/0136173 A1 * | 7/2003 | Elenich | G01F 9/001 73/1.73 |
| 2005/0066703 A1 | 3/2005 | Broden et al. | |
| 2005/0178463 A1 | 8/2005 | Kountz et al. | |
| 2005/0247123 A1 | 11/2005 | Fuse | |
| 2006/0096581 A1 * | 5/2006 | Pauli | F02B 27/02 123/480 |
| 2007/0051423 A1 * | 3/2007 | Handa | 141/94 |
| 2010/0185360 A1 * | 7/2010 | Windbergs | G01F 23/0076 701/29.2 |
| 2010/0245098 A1 * | 9/2010 | Kanie | 340/632 |
| 2010/0253529 A1 * | 10/2010 | Umayahara | 340/632 |
| 2010/0307636 A1 * | 12/2010 | Uemura | 141/4 |
| 2013/0014855 A1 * | 1/2013 | Yahashi | G01M 3/26 141/1 |

FOREIGN PATENT DOCUMENTS

| | | |
|---|---|---|
| DE | 41 29 020 | 3/1993 |
| DE | 10 2006 036 785 | 2/2008 |
| EP | 1 205 704 | 5/2002 |
| JP | 2004019855 A | 1/2004 |
| JP | 2005283127 A | 10/2005 |
| JP | 2005-325950 | 11/2005 |
| JP | 2006140132 A | 6/2006 |
| JP | 2011021972 * | 2/2011 |
| WO | WO 96/22915 | 8/1996 |
| WO | WO 2009/116475 A1 * | 9/2009 |

* cited by examiner

GAS SUPPLY SYSTEM AND CORRECTION METHOD

BACKGROUND OF THE INVENTION

Cross-Reference to Related Applications

This application is a United States National Stage Patent Application filed under 35 U.S.C. § 371, based on International Application Serial No. PCT/IB2011/001841, which was filed on Aug. 10, 2011, which claims priority to Japanese Patent Application No. 2010-184813, filed on Aug. 20, 2010, the entire contents of each of which are expressly incorporated herein by reference.

1. Field of the Invention

The invention relates to a correction of a relationship between a pressure of a gas inside a fuel tank in a vehicle and an output voltage of a pressure sensor at the time when the pressure is measured by the pressure sensor.

2. Description of Related Art

A vehicle employing hydrogen as a source of energy is provided with a hydrogen gas storage tank. The pressure in the hydrogen gas storage tank is monitored by, for example, a pressure sensor (e.g., see Japanese Patent Application Publication No. 2005-325950 (JP-A-2005-325950)).

A hydrogen gas storage tank in a fuel-cell-powered vehicle stores therein hydrogen at an extremely high pressure equal to or higher than about 70 MPa. In some cases, therefore, there is employed a pressure sensor designed, for example, to detect a pressure applied to a membrane (a diaphragm) as a degree of deformation of the membrane using a strain sensor and generate an output voltage corresponding to an amount of strain. In such a pressure sensor, hydrogen may dissolve into the diaphragm of the pressure sensor to cause the diaphragm to expand. In this case, it may be difficult to correctly determine a pressure of the hydrogen gas storage tank based on the output voltage of the pressure sensor.

SUMMARY OF THE INVENTION

The invention makes it possible to correct a relationship between a pressure in a fuel tank (a hydrogen gas storage tank, a gas cylinder) and an output voltage of a pressure sensor.

A first aspect of the invention relates to a gas supply system that includes a fuel tank to which a gas is supplied from a gas tank of a gas station; a gas flowmeter that measures an amount of the gas supplied from the gas tank to the fuel tank; a temperature sensor that measures a temperature of the gas in the fuel tank; a pressure sensor that measures a pressure of the gas in the fuel tank and generates an output signal in accordance with the pressure; and a control portion that corrects a relationship between the pressure applied to the pressure sensor and a value of the output signal. The control portion acquires a first temperature of the gas in the fuel tank, a first pressure of the gas in the fuel tank, and a first output signal value of the pressure sensor corresponding to the first pressure before supply of the gas, the control portion acquires a first amount of the gas in the fuel tank using a volume of the fuel tank, the first temperature and the first pressure, the control portion acquires a second amount of the gas in the fuel tank after supply of the gas, through integration of a measurement value obtained by the gas flowmeter during supply of the gas, the control portion acquires a second temperature of the gas in the fuel tank, a second pressure of the gas in the fuel tank, and a second output signal value of the pressure sensor corresponding to the second pressure after supply of the gas, the control portion calculates a third pressure of the gas in the fuel tank using the volume of the fuel tank, the second amount of the gas, and the second temperature, and the control portion corrects the relationship between the output signal of the pressure sensor and the pressure in the fuel tank using the first pressure, the first output signal value, the third pressure, and the second output signal value.

In the gas supply system according to the above-described aspect, the control portion may correct the relationship between the output signal of the pressure sensor and the pressure in the fuel tank by changing a pressure corresponding to the second output signal value from the second pressure to the third pressure. Thus, in this aspect, the relationship between the output voltage of the pressure sensor and the pressure in the fuel tank is corrected by changing the pressure corresponding to the second output signal value from the second pressure to the third pressure. Therefore, it is possible to correctly determine the pressure based on the output voltage.

In the gas supply system according to the above-described aspect, the control portion may correct the relationship between the output signal of the pressure sensor and the pressure in the fuel tank when a ratio of the second pressure to the third pressure is equal to or smaller than a predetermined first ratio, or equal to or larger than a predetermined second ratio. In this aspect, when a difference between the second pressure and the third pressure is small, it is not necessary to carry out the correction.

In the gas supply system according to the above-described aspect, a pressure reducing valve may be connected to a side of the fuel tank, the side being opposite to a side of the fuel tank, which is connected to the gas station, the pressure sensor may be a first pressure sensor that measures a pressure of the gas on one side of the pressure reducing valve, on which the fuel tank is located, the gas supply system may further include a second pressure sensor that measures a pressure of the gas on another side of the pressure reducing valve, the other side being opposite to the one side, and the control portion may correct the relationship between an output signal of the first pressure sensor and the pressure in the fuel tank using an output signal value of the first pressure sensor as the first output signal value and a pressure obtained from the second pressure sensor as the first pressure, when a pressure obtained from, the first pressure sensor is equal to or lower than a predetermined pressure and a pressure downstream of the pressure reducing valve is equal to a pressure upstream of the pressure reducing valve, the pressure downstream of the pressure reducing valve being a pressure of the gas that has passed through the pressure reducing valve, and the pressure upstream of the pressure reducing valve being a pressure of the gas that has not passed through the pressure reducing valve. In this aspect, the relationship between the output voltage of the first pressure sensor and the pressure in the fuel tank is corrected by changing the first pressure. Therefore, it is possible to correctly determine the pressure based on the output voltage.

In the gas supply system according to the above-described aspect, the control portion may calculate the first amount of the gas using the volume of the fuel tank, the first temperature, and the first pressure, may calculate the second amount of the gas using the volume of the fuel tank, the second temperature, and the second pressure, and may correct the measurement value obtained by the gas flowmeter, when a ratio of the second pressure to the third pressure is equal to or smaller than a predetermined third ratio, or equal to or larger than a predetermined fourth ratio. In this aspect, when the difference between the second pressure, and the third pressure, the measurement value obtained by the flowmeter is corrected.

A second aspect of the invention relates to a correction method for correcting a relationship between a pressure applied to a pressure sensor connected to a fuel tank and an output signal of the pressure sensor. The correction method includes acquiring a first temperature of the gas in the fuel tank, a first pressure of the gas in the fuel tank, and a first output signal value of the pressure sensor corresponding to the first pressure before supply of the gas; acquiring a first amount of the gas in the fuel tank using a volume of the fuel tank, the first temperature, and the first pressure; acquiring a second amount of the gas, in the fuel tank after supply of the gas, through integration of a measurement value obtained by the gas flowmeter during supply of the gas; acquiring a second temperature of the gas in the fuel tank, a second pressure of the gas in the fuel tank, and a second output signal value of the pressure sensor corresponding to the second pressure after supply of the gas; calculating a third pressure of the gas in the fuel tank using the volume of the fuel tank, the second amount of the gas, and the second temperature; and correcting the relationship between the output signal of the pressure sensor and the pressure in the fuel tank using the first pressure, the first output signal value, the third pressure, and the second output signal value.

The invention may be realized in various aspects. For example, the invention may be realized as a gas supply device, a gas supply method, and a method of correcting a detected value of a pressure in a tank during supply of a gas.

BRIEF DESCRIPTION OF THE DRAWINGS

Features, advantages, and, technical and industrial significance of exemplary embodiments of the invention will be described below with reference to the accompanying drawings, in which like numerals denote like elements, and wherein.

DETAILED DESCRIPTION OF EMBODIMENTS

Figure 1:
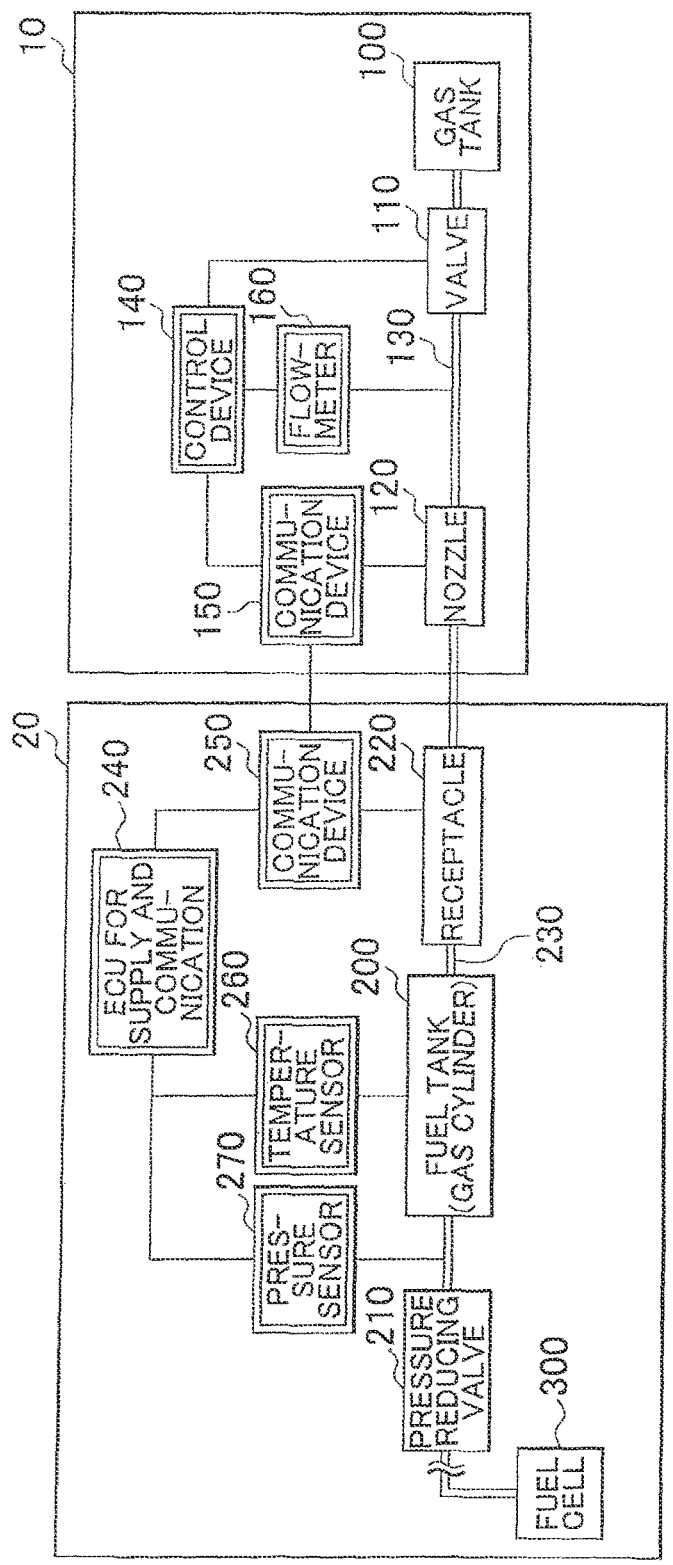
FIG. 1 is an illustrative view showing a configuration of a gas supply system according to the first embodiment of the invention.

FIG. 1 is an illustrative view showing a configuration of a gas supply system according to the first embodiment of the invention. The gas supply system includes a gas station 10 that supplies a gas, and a vehicle 20 that is supplied with the gas. The gas station 10 includes a gas tank 100, a valve 110, a nozzle 120, a gas pipe 130, a control device 140, a communication device 150, and a flowmeter 160. The vehicle 20 includes a fuel tank (although referred to also as "a gas cylinder" in this embodiment of the invention, the fuel tank of the invention is not limited to "the gas cylinder") 200, a pressure reducing valve 210, a receptacle 220, a gas pipe 230, an ECU 240 for supply and communication, a communication device 250, a temperature sensor 260, a pressure sensor 270, and a fuel cell 300.

In the gas station 10, the gas tank 100 and the nozzle 120 are connected to each other by the gas pipe 130, and the gas pipe 130 is provided with the valve 110. The nozzle 120 of the gas station 10 is connected to the receptacle 220 of the vehicle 20, and the receptacle 220 is connected to the gas cylinder 200 via the gas pipe 230. The gas cylinder 200 is connected to the fuel cell 300 via the pressure reducing valve 210. In this embodiment of the invention, the gas in the gas tank 100 is supplied to the gas cylinder 200 via the valve 110, the gas pipe 130, the nozzle 120, the receptacle 220, and the gas pipe 230.

The flowmeter 160 of the gas station 10 is connected to the gas pipe 130 to measure a flow rate of the gas flowing through the gas pipe 130 per unit time. The temperature sensor 260 of the vehicle 20 measures a temperature of the gas in the gas cylinder 200. The pressure sensor 270 measures a pressure of the gas in the gas cylinder 200.

The ECU 240 for supply and communication, which belongs to the vehicle 20, acquires the temperature of the gas in the gas cylinder 200 from the temperature sensor 260, and acquires the pressure of the gas in the gas cylinder 200 from the pressure sensor 270. In this case, the ECU 240 for supply and communication acquires output voltages of the temperature sensor 260 and the pressure sensor 270, and calculates a temperature and a pressure from these output voltages. The ECU 240 for supply and communication sends the temperature and pressure of the gas in the gas cylinder 200 and a volume of the gas cylinder 200 to the control device 140 of the gas station 10 via the communication device 250 and the communication device 150 of the gas station 10. The communication device 150 includes an infrared light-emitting portion and an infrared light-receiving portion, which are provided in the vicinity of the nozzle 120, and the communication device 250 includes an infrared light-emitting portion and an infrared light-receiving portion, which are provided in the vicinity of the receptacle 220. When the nozzle 120 and the receptacle 220 are coupled to each other, the communication device 150 and the communication device 250 may communicate with each other through infrared communication. The control device 140 of the gas station 10 controls the opening/closing of the valve 110 on the basis of the temperature and pressure of the gas in the gas cylinder 200, thereby controlling the supply of the gas from the gas tank 100 to the gas cylinder 200. Further, the control device 140 acquires a flow rate of the gas from the flowmeter 160 and integrates the acquired flow rate, thereby calculating an amount of the gas supplied from the gas tank 100 to the gas cylinder 200.

Figure 2:
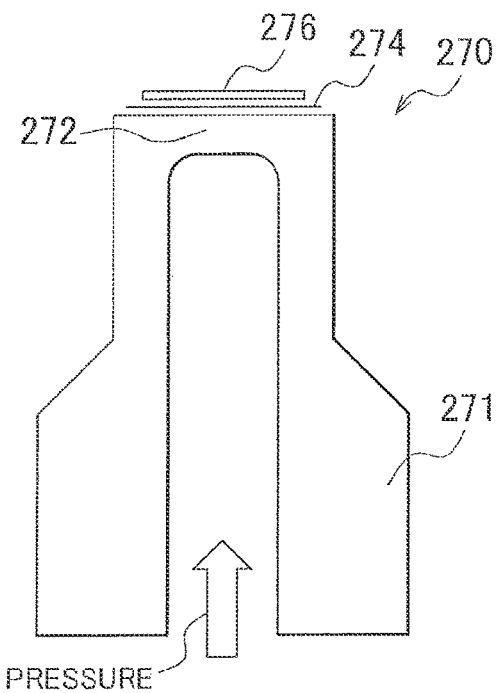
FIG. 2 is an illustrative view showing a configuration of a pressure sensor.

FIG. 2 is an illustrative view showing a configuration of the pressure sensor 270. The pressure sensor 270 includes a stem 271, a glass layer 274, and a sensor chip 276. The stem 271 is a generally cylindrical metallic member and is equipped, at a top portion thereof, with a diaphragm (a thin film portion) 272. The glass layer 274 is arranged in contact with the diaphragm 272, and the sensor chip 276 is arranged in contact with the glass layer 274. A single-crystal piezoresistor can be employed as the sensor chip 276. When the pressure inside the pressure sensor 270 becomes high, the diaphragm 272 expands outward to deform the sensor chip 276 via the glass layer 274. The sensor chip 276 generates a voltage in accordance with an amount of deformation thereof. The ECU 240 for supply and communication determines a pressure based on a value of this voltage.

Figure 3:
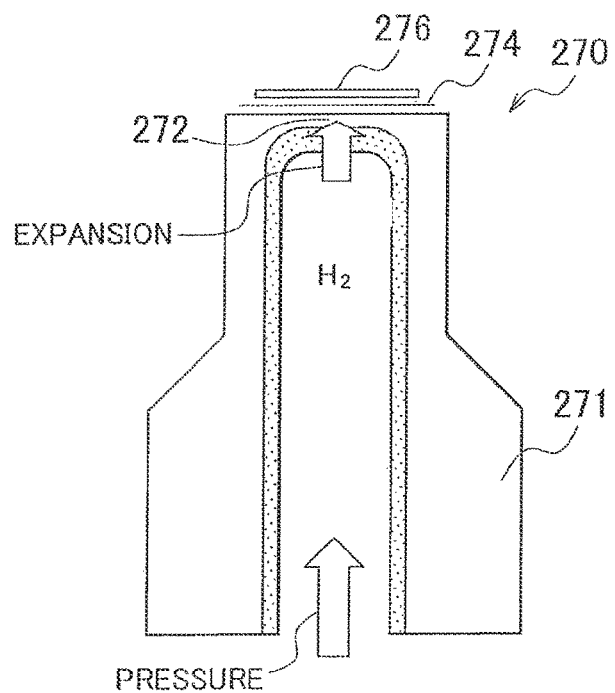
FIG. 3 is an illustrative view showing a state in which a pressure inside a gas cylinder is high.

FIG. 3 is an illustrative view showing a state in which the pressure inside the gas cylinder 200 is high. In the case where the pressure of the gas cylinder 200 is high, the partial pressure of hydrogen in the gas cylinder 200 is high. In this case, part of the hydrogen dissolves into the diaphragm 272. As a result, the diaphragm 272 expands, and a stress resulting from the expansion of the diaphragm 272, as well as the pressure, is applied to the sensor chip 276. Accordingly, when determining a pressure of the gas in the gas cylinder 200 based on a value of an output voltage of this sensor chip, the ECU 240 for supply and communication is required to correct the pressure in consideration of the stress resulting from the expansion of the diaphragm 272.

Figure 4:
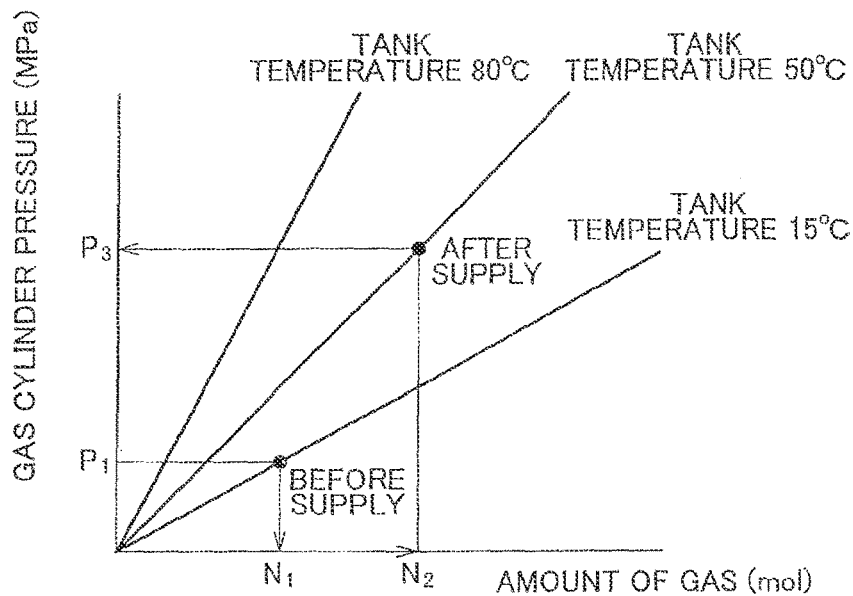
FIG. 4 is an illustrative view showing a relationship between an amount of a gas in the gas cylinder and the pressure of the gas.

FIG. 4 is an illustrative view showing a relationship between an amount of the gas in the gas cylinder and the pressure of the gas. In general, the pressure increases as the amount of the gas in the gas cylinder increases, and the pressure increases as the temperature of the gas rises. Given that V (m$^3$), P (Pa), T (K), and a (mol) represent the volume of the gas cylinder, the pressure, the temperature, and the amount of the gas respectively, there is established a relationship:

$$PV=nRT \quad (1)$$

This equation (1) is referred to as the equation of state of ideal gas. A constant R is referred to as a gas constant, and R=8.31 JK$^{-1}$mol$^{-1}$. An intermolecular force is applied between molecules of the gas, and the size of the molecules cannot be ignored. In general, therefore, the equation of state of real gas is used.

An equation (2) indicates an example of the equation of state of real gas (the van der Waals' equation of state).

$$\left(P + \frac{an^2}{V^2}\right)(V - nb) = nRT \quad (2)$$

In the equation (2), "+an$^2$/V$^2$" in the first term is set taking into account the intermolecular force (the van der Waals force), and "−nb" in the second term is set taking into account a decrease in a space where molecules move. Coefficients "a" and "b" are referred to as van der Waals coefficients. In the case where the gas is hydrogen, the van der Waals coefficient "a" is 24.8×10$^{-3}$ Pa_m$^6$mol$^{-2}$, and the van der Waals coefficient "b" is 26.7×10$^{-6}$ m$^3$mol$^{-1}$.

Given that V, $P_1$, $T_1$, and $N_1$ represent the volume of the gas cylinder 200, the pressure, the temperature, and the number of moles of the gas before the supply of the gas respectively, an equation (3) shown below is obtained from the equation (2).

$$\left(P_1 + \frac{aN_1^2}{V^2}\right)(V - N_1 b) = N_1 RT_1 \quad (3)$$

By acquiring the volume V, the pressure $P_1$, and the temperature $T_1$, and substituting the acquired values for V,
$P_1$, and $T_1$ in the equation (3) respectively to find a solution, the number of moles $N_1$ can be calculated.

Given that $P_3$, $T_2$, and $N_2$ represent the pressure, the temperature, and the number of moles of the gas after the supply of the gas respectively, an equation (4) shown below is obtained from the equation (2).

$$\left(P_3 + \frac{aN_2^2}{V^2}\right)(V - N_2 b) = N_2 RT_2 \quad (4)$$

An equation (5) is obtained when the equation (4) is modified.

$$P_3 = \frac{N_2 RT_2}{V - N_2 b} - \frac{aN_2^2}{V^2} \quad (5)$$

It should be noted herein that the amount $N_2$ of the gas after the supply of the gas is equal to $N_1+\Delta N$. $N_1$ represents the number of moles of the gas in the gas cylinder 200 before the supply of the gas. $\Delta N$ represents the amount of the newly supplied gas, and can be easily calculated through integration of a measurement value obtained by the flowmeter 160 of the gas station 10. The temperature $T_2$ can be measured by the temperature sensor 260. Accordingly, the pressure $P_3$ can be calculated using the equation (5).

It should be noted that in the case where the gas cylinder 200 is formed of a material such as a metal, the volume V of the gas cylinder may be large as a result of expansion of the gas cylinder at certain temperatures. In the equation (5), accordingly, the pressure $P_3$ may be calculated in consideration of the expansion of the gas cylinder 200 due to certain temperatures. Furthermore, since the pressure $P_3$ is higher than the atmospheric pressure, the gas cylinder 200 may expand due to a difference between a pressure inside the gas cylinder 200 and a pressure outside the gas cylinder 200. In this case, the pressure $P_3$ is temporarily calculated using the equation (5), the volume V of the gas cylinder 200 is corrected referring to the pressure $P_3$ and the atmospheric pressure, and the pressure $P_3$ is calculated again according to the equation (5) using the corrected volume V. This process may be repeated, and a pressure at the time when a change in the calculated pressure $P_3$ has fallen into a certain range may be regarded as the pressure $P_3$.

Figure 5:
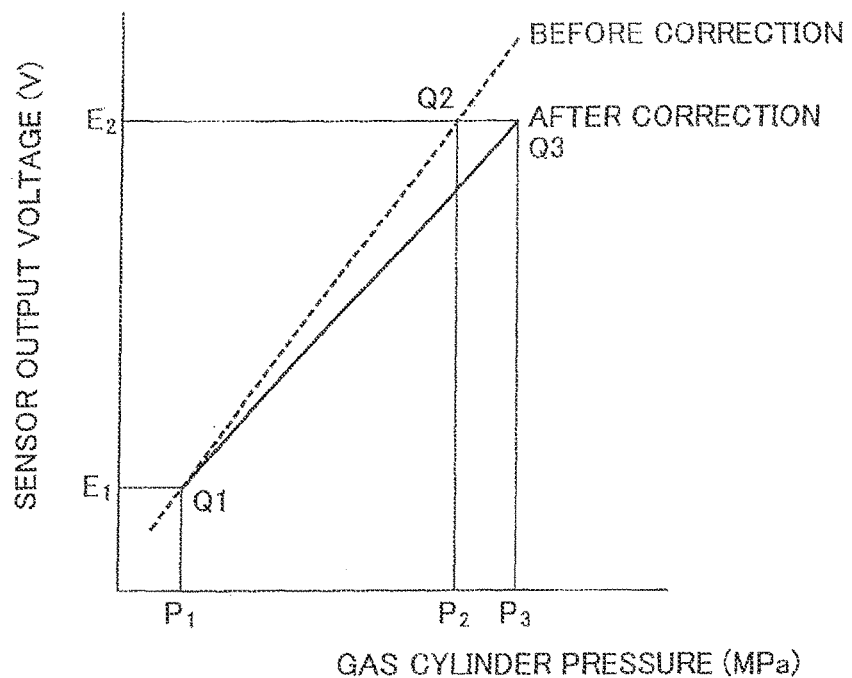
FIG. 5 is an illustrative view showing a relationship between a pressure and a sensor output voltage.

FIG. 5 is an illustrative view showing a relationship between a pressure and a sensor output voltage. Broken lines (a straight line passing through points Q1 and Q2) indicate a relationship between the pressure and the sensor output voltage before the correction in this embodiment of the invention is carried out, and a solid line (a straight line, passing through the point Q1 and a point Q3) indicates a relationship between the pressure and the sensor output voltage after the correction in this embodiment of the invention is carried out. Before the correction is carried out, the pressure of the gas cylinder 200 is equal to $P_1$ before the supply of the gas, and the sensor output voltage at this moment is equal to $E_1$ (the point Q1). It is assumed that the sensor output voltage has become equal to $E_2$ after the supply of the gas. In this case, the pressure $P_2$ after the supply of the gas is determined using a graph showing a relationship between the pressure and the sensor output voltage (the point Q2).

It should be noted herein that there is no need to correct the pressure when the pressure $P_2$ and the pressure $P_3$ are substantially equal to each other. However, as described with reference to FIG. 3, it becomes impossible to correctly determine the pressure based on the sensor output voltage when the pressure becomes high. Accordingly, the relationship between the sensor output voltage and the pressure is corrected using the pressure calculated using the equation (5). More specifically, a point corresponding to the pressure $P_3$ and the output voltage $E_2$ is used as a point on a high-pressure side (the point Q3). It should be rioted that although an example where $P_3$ is higher than $P_2$ ($P_3>P_2$) is described in this embodiment of the invention, there May be a case where $P_3$ is lower than $P_2$ ($P_3<P_2$) when another graph is used to indicate the relationship between the pressure and the sensor output voltage before the correction. By carrying out this correction, an equation representing a relationship between the pressure and the output voltage of the pressure sensor 270 is expressed by a straight line passing through the points Q1 and Q3, and thus, the pressure of the gas in the gas cylinder 200 can be correctly determined based on the output voltage of the pressure sensor 270. Thus, when the gas is consumed through the operation of a fuel cell (not shown), the pressure of the gas in the gas cylinder 200 can be correctly determined based on the output voltage of the pressure sensor 270.

Figure 6:
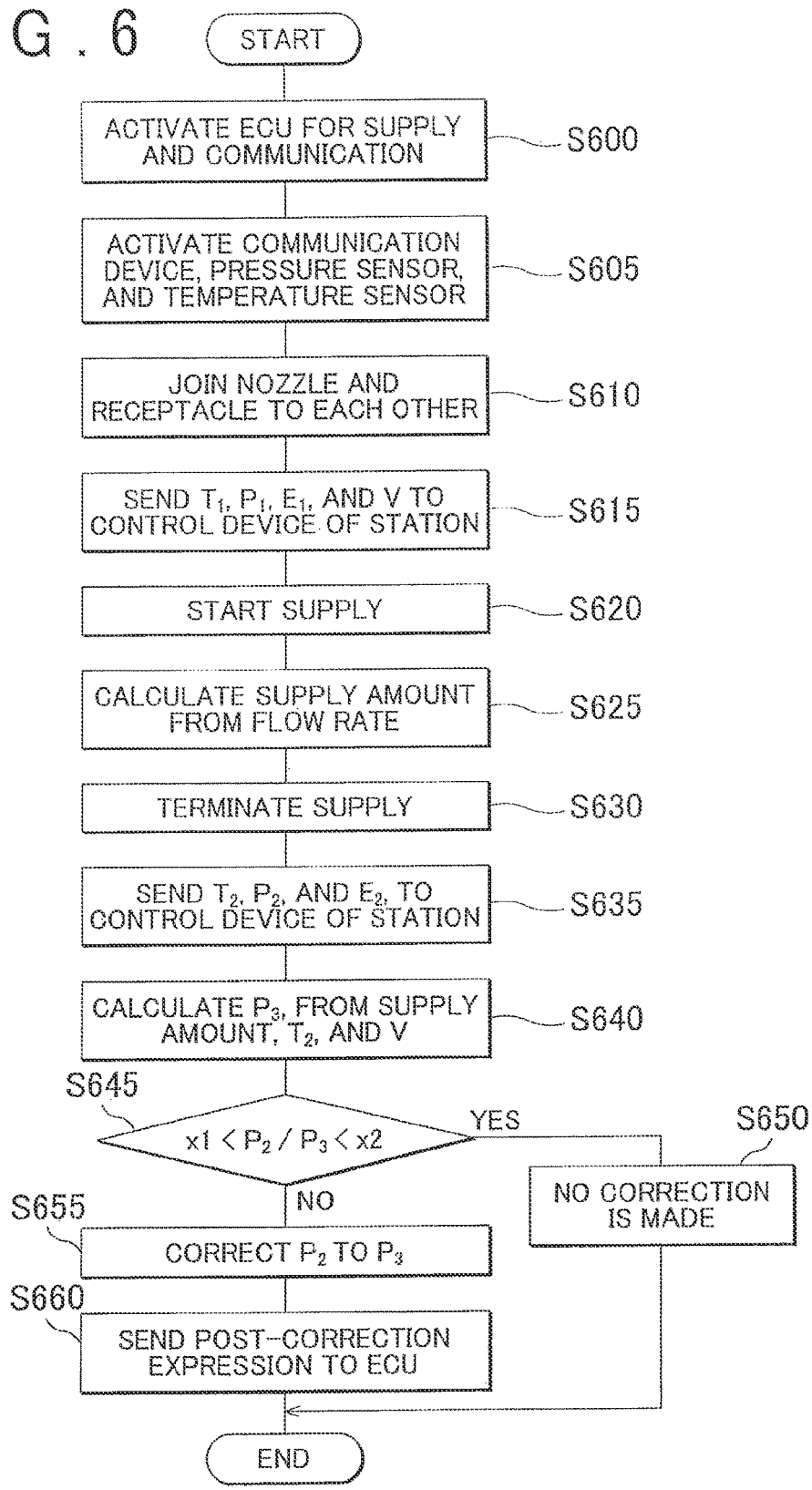
FIG. 6 is a flowchart showing an operation in the first embodiment of the invention.

FIG. 6 is a flowchart showing an operation in the first embodiment of the invention. In step S600, the ECU 240 for supply and communication, which belongs to the vehicle 20, is activated. The ECU 240 for supply and communication may be activated when a driver or an operator of the gas station 10 opens a lid (not shown) of the receptacle 220. Then in step S605, the ECU 240 for supply and communication activates the communication device 250, the temperature sensor 260, and the pressure sensor 270. In step S610, the operator of the gas station 10 inserts the nozzle 120 of the gas station 10 into the receptacle 220 of the vehicle 20. Thus, the gas can be supplied from the gas station 10 to the vehicle 20. When the nozzle 120 and the receptacle 220 are coupled to each other, the communication device 150 of the gas station 10 and the communication device 250 of the vehicle 20 can communicate with each other.

In step S615, the ECU 240 for supply and communication acquires the temperature $T_1$ and pressure $P_1$ of the gas inside the gas cylinder 200 and the output voltage $E_1$ from the temperature sensor 260 and the pressure sensor 270, and sends these acquired values and the volume V of the gas cylinder 200 to the control device 140 of the gas station 10. It should be noted that the value of the volume V of the gas cylinder 200 is obtained in advance from design data on the gas cylinder 200, and is stored in, for example, the ECU 240 for supply and communication.

In step S620, the control device 140 of the gas station 10 first calculates the number of moles $N_1$ of the gas in the gas cylinder 200 before the supply of the gas from the temperature $T_1$ and pressure $P_1$ of the gas inside the gas cylinder 200 and the volume V of the gas cylinder 200, using the van der Waals' equation of state (refer to Equation (3)). The control device 140 then opens the valve 110 to start supplying the gas cylinder 200 with the gas. In step S625, the control device 140 acquires a flow rate of the gas using the flowmeter 160, and acquires the gas supply amount $\Delta N$, namely, the amount of the gas supplied to the gas cylinder. In step S630, the control device 140 closes the valve 110 to stop supplying the gas cylinder 200 with the gas. As a condition for stopping the supply of the gas, the control device 140 can adopt various conditions, for example, a condition that the gas supply amount $\Delta N$ should reach a certain amount, a condition that the pressure of the gas in the gas cylinder 200, which is obtained from the pressure sensor 270, should reach a predetermined value, and a condition that the temperature of the gas in the gas cylinder 200, which is obtained from the temperature sensor 260, should reach a predetermined value.

In step S635, the ECU 240 for supply and communication acquires the temperature $T_2$ and pressure $P_2$ of the gas inside the gas cylinder 200 and the output voltage $E_2$ after the supply of the gas, and sends these acquired values to the control device 140 of the gas station 10. It should be noted that the volume V of the gas cylinder 200 has already been sent in step S615.

In step S640, the control device 140 of the gas station 10 calculates the pressure $P_3$ of the gas in the gas cylinder 200 after the supply of the gas from the temperature $T_2$ of the gas inside the gas cylinder 200, the volume V of the gas cylinder 200, and the amount of the gas $N_2$ ($=N_1+\Delta N$) in the gas cylinder 200 after the supply of the gas, using the van der Waals' equation of state (refer to Equation (5)).

In step S645, the control device 140 compares the pressure $P_2$ obtained from the ECU 240 for supply and communication and the pressure $P_3$ obtained from the van der Waals' equation of state with each other, and determines whether a value $P_2/P_3$ is larger than x1 and smaller than x2. It should be noted herein that x1 is a value smaller than 1, that x2 is a value larger than 1, and that x1 and x2 can be arbitrarily determined in advance. It is possible to regard x1 as the first ratio of the invention, and x2 as the second ratio of the invention. On the assumption that a correction is carried out when the pressure $P_2$ is higher or lower than the pressure $P_3$ by 5% or more, x1=0.95 and x2=1.05. When $P_2/P_3$ is larger than x1, and smaller than x2 (x1<$P_2/P_3$<x2), the control device 140 shifts the processing to step S650 and the correction is not carried out. On the other hand, when $P_2/P_3$ is equal to or smaller than x1, or $P_2/T_3$ is equal to or larger than x2 ($P_2/P_3 \leq$ x1 or x2$\leq P_2/P_3$), the control device 140 shifts the processing to step S655 and the correction is carried out. More specifically, as shown in FIG. 5, the control device 140 changes the pressure corresponding to the output voltage $E_2$ from $P_2$ to $P_3$. In step S660, the control device 140 obtains a relational expression between the pressure and the output voltage after the correction, and sends this relational expression to the ECU 240 for supply and communication, which belongs to the vehicle 20. After that, the ECU 240 for supply and communication, which belongs to the vehicle 20, can acquire the pressure of the gas cylinder 200 based on the output voltage of the pressure sensor 270 using the post-correction relational expression. The pressure $P_1$ may be regarded as the first pressure of the invention, the pressure $P_2$ may be regarded as the second pressure of the invention, and the pressure $P_3$ may be regarded as the third pressure of the invention. Further, the output voltage $E_1$ may be regarded as the first output signal value of the invention, and the output voltage $E_2$ may be regarded as the second output signal value of the invention.

As described above, according to this embodiment of the invention, the pressure of the gas is corrected using the gas supply amount. Therefore, the pressure can be correctly determined based on the output voltage of the pressure sensor 270 even in the case where the diaphragm 272 of the pressure sensor 270 expands due to the dissolution of hydrogen into the pressure sensor 270.

Second Embodiment

Figure 7:
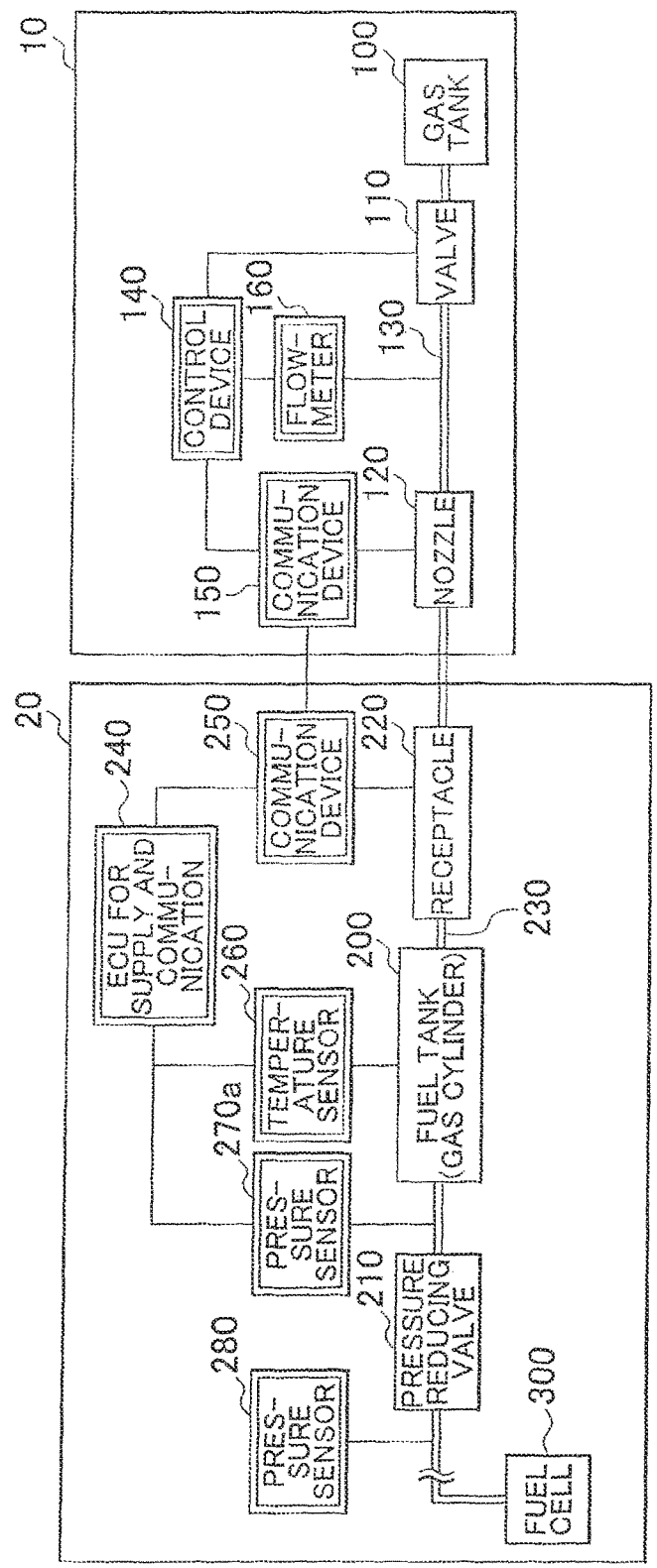
FIG. 7 is an illustrative view showing a configuration in the second embodiment of the invention.

FIG. 7 is an illustrative view showing a configuration of the second embodiment of the invention. In the second embodiment of the invention, a pressure correction is carried out not only in a high-pressure range but also in a, low-pressure range. In the first embodiment of the invention, the pressure sensor 270 is provided upstream of the pressure reducing valve 210 of the vehicle 20. In the second embodiment of the invention, pressure sensors are provided upstream and downstream of the pressure reducing valve 210 respectively. Hereinafter; in order to distinguish between both the pressure sensors, the pressure sensor upstream of the pressure reducing valve 210 will be referred to as an upstream pressure sensor 270a, and the pressure sensor downstream of the pressure reducing valve 210 will be referred to as a downstream pressure sensor 280.

Figure 8:
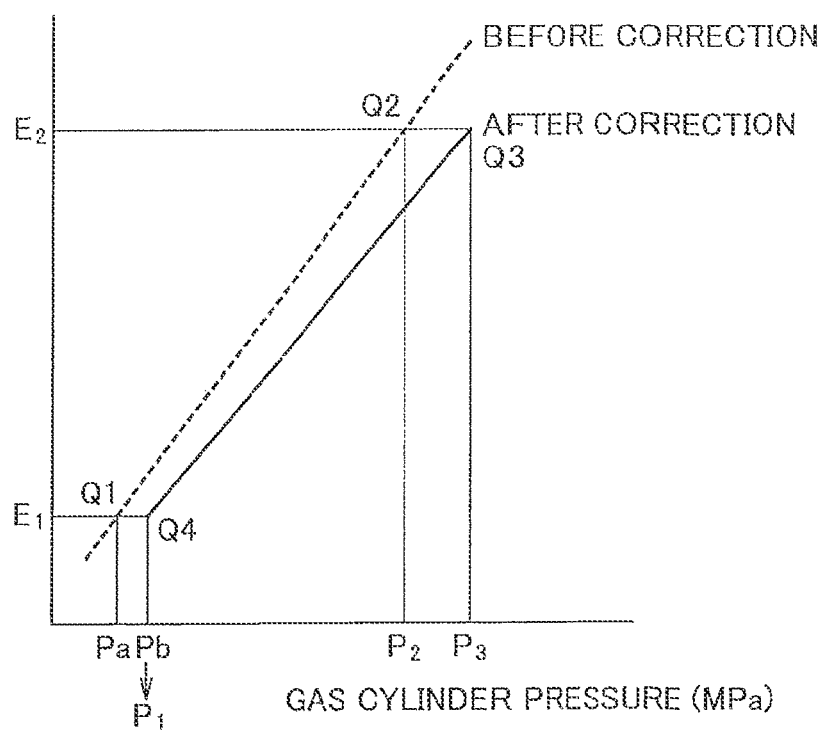
FIG. 8 is an illustrative view showing a relationship between a pressure and an output voltage of a pressure sensor in the second embodiment of the invention.

FIG. 8 is an illustrative view showing a relationship between a pressure and an output voltage of each of the pressure sensors in the second embodiment of the invention. Broken lines (a straight line passing through the points Q1 and Q2) indicate a relationship between the pressure and the sensor output voltage before, a correction in this embodiment of the invention is carried out, and a solid line (a straight line passing through the points Q4 and Q3) indicates a relationship between the pressure and the sensor output voltage after the correction in this embodiment of the invention is carried out. Since the points Q1, Q2, and Q3 are the same as in the first embodiment of the invention, the point Q4 will be described. The point Q4 is a point corresponding to a pressure $P_b$ and the output voltage $E_1$. It should be noted that the pressure $P_b$ is a value of a pressure indicated by the downstream pressure sensor 280.

When a primary pressure upstream of the pressure reducing valve 210 falls to or below the regulated pressure value of the pressure reducing valve 210, a secondary pressure downstream of the pressure reducing valve 210 and the primary pressure upstream of the pressure reducing valve 210 become equal to each other. However, because the pressure upstream of the pressure reducing valve 210 is measured by the upstream pressure sensor 270a, and the pressure downstream of the pressure reducing valve 210 is measured by the downstream pressure sensor 280, a pressure value calculated from an output voltage indicated by the upstream pressure sensor 270a and a pressure value calculated from an output voltage indicated by the downstream pressure sensor 280 may be different from each other. It should be noted herein that the upstream pressure sensor 270a has a pressure measurement range wide enough to range from a pressure (a high pressure) at the time when the gas is supplied to the gas cylinder 200 to a pressure (a low pressure) at the time when the gas is consumed. In contrast, the downstream pressure sensor 280 measures a pressure downstream of the pressure reducing valve 210. Therefore, the downstream pressure sensor 280 has a pressure measurement range within a low-pressure range. Accordingly, the downstream pressure sensor 280 is more reliable than the upstream pressure censor 270a in measuring a low pressure, especially a low pressure equal to or lower than the regulated pressure value of the pressure reducing valve 210. In consequence, through the use of this feature, a value $P_a$ of the upstream pressure sensor 270a is corrected on the basis of the value $P_b$ indicated by the downstream pressure sensor 280 (the point Q1→the point Q4), on the condition that the primary pressure (an actual primary pressure) upstream of the pressure reducing valve and the secondary pressure (an actual secondary pressure) downstream of the pressure reducing valve be equal to each other. While the straight line passing through the points Q1 and Q2 indicates the relationship between the pressure and the output voltage before the correction, a straight line, passing through the points Q3 and Q4 indicates the relationship between the pressure and the output voltage after the correction.

Figure 9:
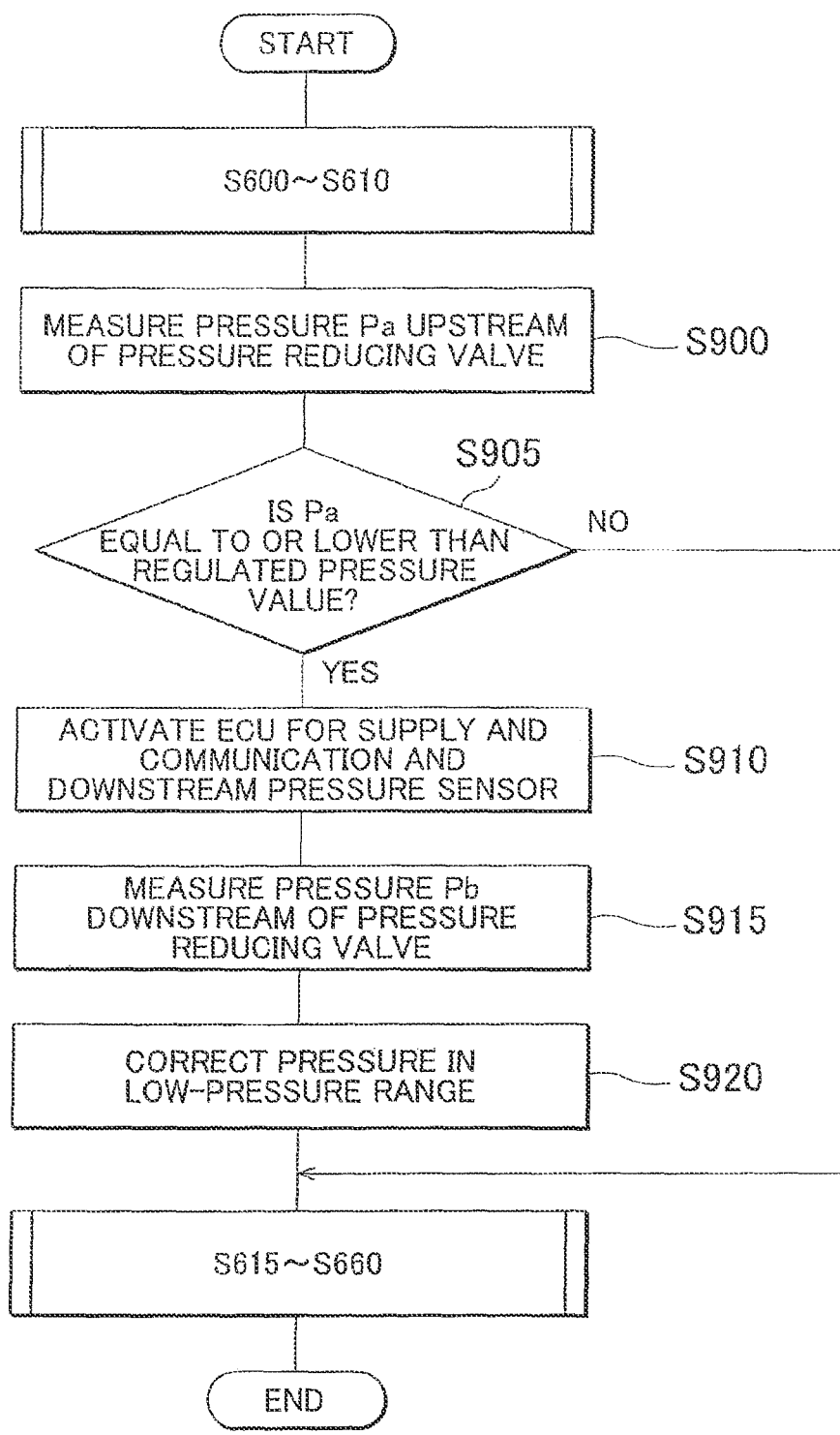
FIG. 9 is a flowchart of an operation in the second embodiment of the invention.

FIG. 9 is a flowchart of an operation of the second embodiment of the invention. The second embodiment of the invention is different from the first embodiment of the invention in that steps (steps S900 to S920) for a correction process in the low-pressure, range are interposed between step S610 and step S615 of the first embodiment of the invention.

In step S900, the ECU 240 for supply and communication measures the pressure (the primary pressure) $P_a$ upstream of the pressure reducing valve 210 (the output voltage $E_1$), using the upstream pressure sensor 270a. In step S905, the ECU 240 for supply and communication determines whether or not the pressure $P_a$ is equal to or lower than the regulated pressure value. This regulated pressure value can be calculated in advance through, for example, an experiment. When the pressure $P_a$ is higher than the regulated pressure value, the ECU 240 for supply and communication shifts the processing to step. S615, and thus, the correction in the low-pressure range is not carried, out. When the pressure $P_a$ is equal to or lower than the regulated pressure value, the ECU 240 for supply and communication shifts the processing to step S910, and thus, the correction in the low-pressure range is carried out.

The ECU 240 for supply and communication activates the downstream pressure sensor 280 in step S910, and measures the pressure $P_b$ (the secondary pressure) downstream of the pressure reducing valve 210 in step S915. In step S920, the ECU 240 for supply and communication corrects the pressure in the low-pressure range. More specifically, the ECU 240 for supply and communication regards the pressure $P_b$, as the pressure at the time when the output voltage of the upstream pressure sensor 270a is equal to $E_1$. The processes of steps S615 to S660 are performed thereafter.

It should be rioted that in step S660, the control device 140 derives a relational expression (refer to the line passing through the points Q3 and Q4) between the pressure and the output voltage after the correction, and sends the derived relational expression to the ECU 240 for supply and communication, which belongs to the vehicle 20. After that, the ECU 240 for supply and communication, which belongs to the vehicle 20, can acquire a pressure of the gas cylinder 200 based on an output voltage of the upstream pressure; sensor 270a using the relational expression after the correction.

As described above, according to this embodiment of the invention, the relationship between the pressure and the output voltage is corrected not only in the high-pressure range but also in the pressure range. Therefore, the pressure can be more correctly determined based-on the output voltage.

Third Embodiment

In the first embodiment of the invention and the second embodiment of the invention, a corrective expression is derived to correct the relationship between the output voltage of the pressure sensor 270 or the upstream pressure sensor 270a and the pressure, and the pressure is calculated from the output voltage of the pressure sensor 270 using; this corrective expression. In the third embodiment of the invention, however, a measurement value obtained by the flow-meter 160 is corrected instead of correcting the relationship between the output voltage and the pressure. It should be rioted that the configuration of the gas supply system is the same the first embodiment of the invention and the second embodiment of the invention and hence will not be described below.

Figure 10:
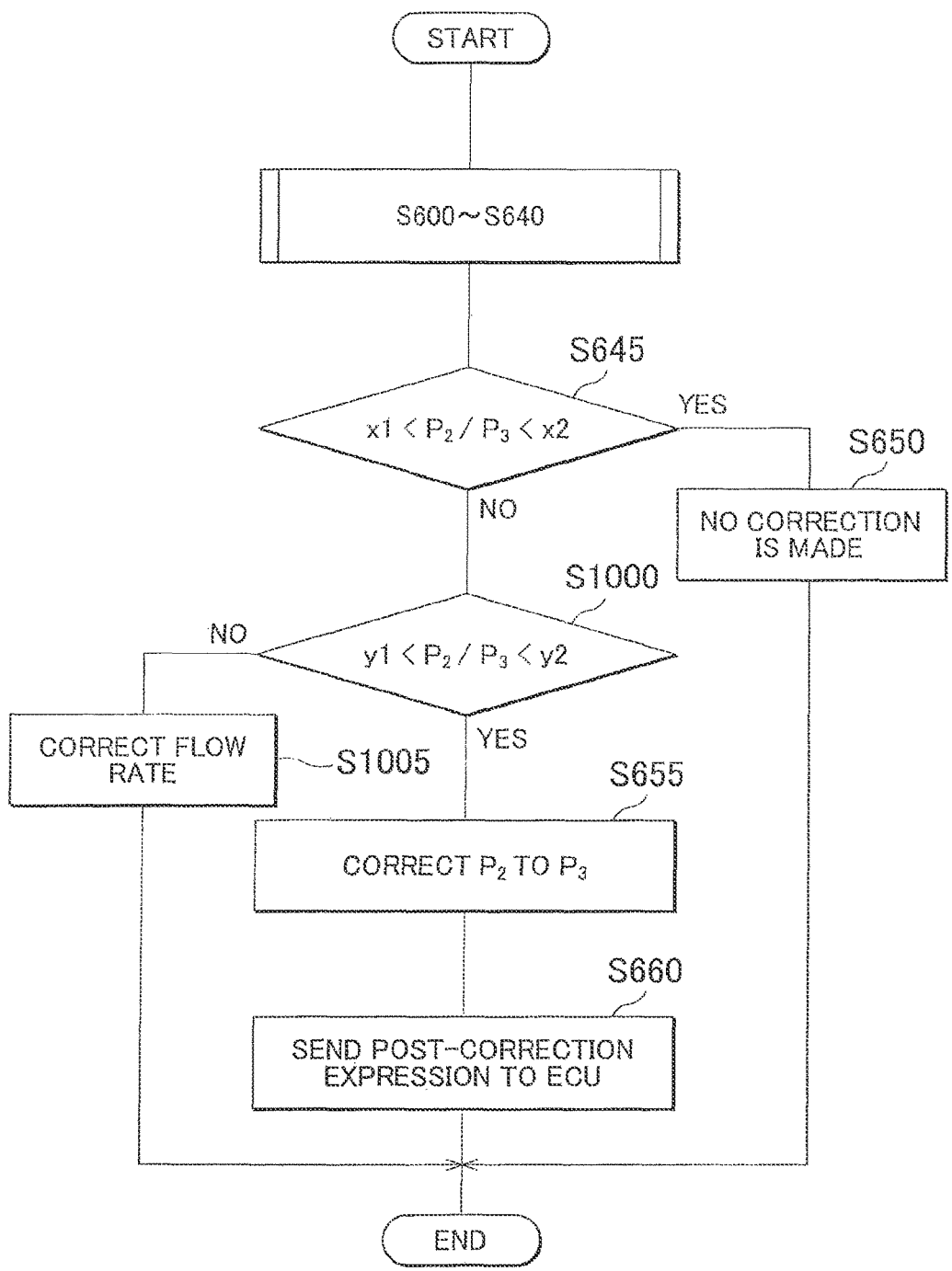
FIG. 10 is a flowchart of an operation in the third embodiment of the invention.

FIG. 10 is a flowchart of an operation of the third embodiment of the invention. Until step S650, the operation of the third embodiment of the invention identical to that of the first embodiment of the invention and hence will not be described below. When $P_2/P_3$ is equal to or smaller than x1, or $P_2/P_3$ is equal to or larger than x2 ($P_2/P_3 \leq x1$ or $x2 \leq P_2/P_3$) in step S645, the processing shifts to step S1000. In step S1000, the control device 140 determines whether to correct the pressure or the flow rate.

In step S1000, it is determined whether or not $P_2/P_3$ is larger than y1 and smaller than y2. It should be noted herein that y1 is a value smaller than x1, and that y2 is a value larger than x2. These values y1 and y2 can be calculated in advance through, for example, an experiment. It is possible to regard y1 as the third ratio of the invention, and y2 as the fourth ratio of the invention. When $P_2/P_3$ is larger than y1 and smaller than y2 (y1<$P_2/P_3$<y2), the processing shifts to step S655. In step S655, the control device 140 corrects the pressure in the high-pressure range. In step S660, the control device 140 derives a relational expression between the pressure and the output voltage after the correction, and sends the derived relational expression to the ECU 240 for supply and communication, which belongs to the vehicle 20. On the other hand, when $P_2/P_3$ is equal to or smaller than y1, or $P_2/P_3$ is equal to or larger than y2 ($P_2/P_3 \leq y1$ or $y2 \leq P_2/P_3$), the processing shifts to step S1005. In step S1005, the control device 140 corrects the measurement value obtained by the flowmeter 160. More specifically, the control device 140 calculates the gas supply amount ΔN, namely, the amount of the gas newly supplied to the gas cylinder 200 using the equation of state of real gas (Equation (2)), and compares this gas supply amount ΔN with a value obtained through integration of the measurement value obtained by the flowmeter 160 (hereinafter, the value will be referred to as "integrated value of the measurement value obtained by the flowmeter 160") to correct the measurement value obtained by the flowmeter 160. More particularly, the control device 140 calculates the first gas amount $N_1$ using the volume V, the first temperature $T_1$, and the first pressure $P_1$, and calculates the second gas amount $N_2$ using the volume V, the second temperature $T_2$, and the second pressure $P_2$. The control device 140 calculates the gas supply amount ΔN using the first gas amount $N_1$ and the second gas amount $N_2$, and compares the gas supply amount ΔN with the integrated value of the measurement value obtained by the flowmeter 160 to correct the measurement value obtained by the flowmeter 160. When the pressure $P_2$ determined using the relationship between the output voltage of the pressure sensor and the pressure is different from the pressure $P_3$ obtained through calculation by a certain value or more, the flowmeter is considered to be in an abnormal state. Accordingly, in the third embodiment of the invention, when the pressure $P_2$ determined using the relationship between the output voltage of the pressure sensor and the pressure is different from the pressure $P_3$ obtained through calculation by the certain value or more, the control device 140 corrects the measurement value obtained by the flowmeter 160.

As described, above, the third embodiment of the invention makes it possible to correct the flow rate as well as the pressure.

It should be noted that although the terms "gas tank" and "gas cylinder" are used to signify a gas container of the gas station 10 and a gas container of the vehicle 20 respectively in each of the foregoing embodiments of the invention, this terminological distinction is made simply for the sake of convenience to distinguish between the two gas containers.

In each of the foregoing embodiments of the invention, the control device 140 of the gas station 10 corrects the expression representing the relationship between the output voltage of the pressure sensor 270 or the upstream pressure sensor 270a and the pressure. However, the ECU 240 for supply and communication, which belongs to the vehicle 20, may acquire the number of moles ΔN representing the gas supply amount from the control device 140, calculate the pressure $P_3$ using Equation (5), and correct the expression representing the relationship between the output voltage of the pressure sensor 270 or the upstream pressure sensor 270a and the pressure.

Although the van der Waals' equation of state is used as the equation of state of real gas in this embodiment of the invention, it is also possible to use other equations of state, for example, the virial equation, the Peng-Robinson equation of state, and the Dieterici equation of state. Further, the control device 140 may use different equations of state for the low-pressure range and the high-pressure range respectively. For example, the Peng-Robinson equation of state is advantageous in calculating a pressure in the high-pressure range.

Although the embodiments of the invention have been described hitherto on the basis of the examples, it should be noted that the foregoing embodiments of the invention are intended not to limit the invention but to facilitate the understanding of the invention. It is obvious that the invention may be modified and improved without departing from the invention and the scope of the claims, and that such equivalents are included in the invention.

The invention claimed is:

1. A gas supply system comprising:
   a fuel tank to which a gas is supplied from a gas tank of a gas station;
   a gas flowmeter that measures an amount of the gas supplied from the gas tank to the fuel tank;
   a temperature sensor that measures a temperature of the gas in the fuel tank;
   a pressure sensor that measures a pressure of the gas in the fuel tank and generates an output signal in accordance with the pressure;
   a pressure reducing valve is connected to a first side of the fuel tank, the first side of the fuel tank being opposite to a second side of the fuel tank,
   the second side of the fuel tank is connected to the gas station,
   the pressure sensor is a first pressure sensor that measures the pressure of the gas on a first side of the pressure reducing valve,
   the fuel tank is located on the first side of the pressure reducing valve,
   the gas supply system further includes a second pressure sensor that measures another pressure of the gas on a second side of the pressure reducing valve, the second side of the pressure reducing valve being opposite to the first side of the pressure reducing valve, and
   a control portion programmed to correct a relationship between the pressure and the output signal, wherein
   the control portion is programmed to acquire a first temperature of the gas in the fuel tank, a first pressure of the gas in the fuel tank, and a first value of the output signal corresponding to the first pressure before a supply of the gas,
   the control portion is programmed to acquire a first amount of the gas in the fuel tank before supply of the gas using a volume of the fuel tank, the first temperature, and the first pressure, the control portion is programmed to acquire a second amount of the gas in the fuel tank, through an integration of a measurement value obtained by the gas flowmeter during the supply of the gas and adding the measurement value obtained by the gas flowmeter to the first amount of the gas after supply of the gas, the control portion is programmed to acquire a second temperature of the gas in the fuel tank, a second pressure of the gas in the fuel tank, and a second value of the output signal corresponding to the second pressure after the supply of the gas is terminated, the control portion is programmed to calculate a third pressure of the gas in the fuel tank after supply of the gas using the volume of the fuel tank, the second amount of the gas, and the second temperature, the control portion is programmed to correct the relationship between the pressure and the output signal using the first pressure, the first value of the output signal, the third pressure, and the second value of the output signal, the pressure sensor includes a diaphragm and a sensor chip, the pressure sensor is configured such that hydrogen dissolving into the diaphragm increases as a pressure of the gas inside the pressure sensor increases, the hydrogen being contained in the gas supplied from the gas tank, the sensor chip generates the output signal in accordance with an amount of deformation of the sensor chip, the control portion is programmed to correct a predetermined linear function of the relationship between the pressure and the output signal to pass through a first point and a second point when a ratio of the second pressure to the third pressure is equal to or smaller than a predetermined first ratio being lower than one, so that the second value of the output signal is changed so as to correspond to the third pressure, the first point corresponds to a combination of the first pressure and the first value of the output signal before the supply of the gas, the second point corresponds to a combination of the third pressure and the second value of the output signal after the supply of the gas is terminated, and the control portion is programmed to correct the relationship between the output signal and the pressure using a value of the output signal as the first value of the output signal and a pressure obtained from the second pressure sensor as the first pressure, when the pressure obtained from the first pressure sensor is equal to or lower than a predetermined pressure and a pressure downstream of the pressure reducing valve is equal to a pressure upstream of the pressure reducing valve, the pressure downstream of the pressure reducing valve being a pressure of the gas that has passed through the pressure reducing valve, and the pressure upstream of the pressure reducing valve being a pressure of the gas that has not passed through the pressure reducing valve.

2. The gas supply system according to claim 1, wherein the control portion is programmed to calculate the first amount of the gas using the volume of the fuel tank, the first temperature, and the first pressure, calculates the second amount of the gas using the volume of the fuel tank, the second temperature, and the second pressure, and corrects the measurement value obtained by the gas flowmeter, when the ratio of the second pressure to the third pressure is equal to or smaller than a predetermined third ratio, or equal to or larger than a predetermined fourth ratio.

3. The gas supply system according to claim 1, wherein the control portion is programmed to calculate the first amount of the gas using the volume of the fuel tank, the first temperature, and the first pressure, calculates the second amount of the gas using the volume of the fuel tank, the second temperature, and the second pressure, and corrects the measurement value obtained by the gas flowmeter, when the ratio of the second pressure to the third pressure is equal to or smaller than a predetermined third ratio, or equal to or larger than a predetermined fourth ratio, the third ratio is smaller than the first ratio, and
the fourth ratio is larger than the first ratio.

4. The gas supply system according to claim 2, wherein the control portion is programmed to correct the measurement value obtained by the gas flowmeter by calculating a gas supply amount that is an amount of the gas supplied to the fuel tank using the first amount of the gas and the second amount of the gas, and comparing the gas supply amount with an integrated value of the measurement value obtained by the gas flowmeter.

5. A correction method for correcting a relationship between a pressure applied to a pressure sensor connected to a fuel tank and an output signal generated by the pressure sensor, wherein a pressure reducing valve is connected to a first side of the fuel tank, the first side of the fuel tank being opposite to a second side of the fuel tank, the second side of the fuel tank is connected to a gas station, the pressure sensor is a first pressure sensor that measures a pressure of a gas on a first side of the pressure reducing valve, the fuel tank is located on the first side of the pressure reducing valve, wherein a second pressure sensor measures another pressure of the gas on a second side of the pressure reducing valve, the second side of the pressure reducing valve being opposite to the first side of the pressure reducing valve, comprising the steps of:

acquiring a first temperature of a gas in the fuel tank, a first pressure of the gas in the fuel tank, and a first value of the output signal corresponding to the first pressure before a supply of the gas;

acquiring a first amount of the gas in the fuel tank before supply of the gas using a volume of the fuel tank, the first temperature, and the first pressure;

acquiring a second amount of the gas in the fuel tank, through an integration of a measurement value obtained by a gas flowmeter during the supply of the gas and adding the measurement value obtained by the gas flowmeter to the first amount of the gas after supply of the gas;

acquiring a second temperature of the gas in the fuel tank, the second pressure of the gas in the fuel tank, and a second value of the output signal corresponding to the second pressure after the supply of the gas is terminated;

calculating a third pressure of the gas in the fuel tank after supply of the gas using the volume of the fuel tank, the second amount of the gas, and the second temperature;

correcting the relationship between the pressure and the output signal using the first pressure, the first value of the output signal, the third pressure, and the second value of the output signal; and correcting a predetermined linear function of the relationship between the pressure and the output signal to pass through a first point and a second point, when a ratio of the second pressure to the third pressure is equal to or smaller than a predetermined first ratio being lower than one, so that the second value of the output signal is changed so as to correspond to the third pressure, wherein the pressure sensor includes a diaphragm and a sensor chip and is configured such that hydrogen dissolving into the diaphragm increases as a pressure of the gas inside the pressure sensor increases, the hydrogen being contained in the gas supplied from the gas tank, the sensor chip generates the output signal in accordance with an amount of deformation of the sensor chip, the first point corresponds to a combination of the first pressure and the first value of the output signal before the supply of the gas, and the second point corresponds to a combination of the third pressure and the second value of the output signal after the supply of the gas is terminated, and correcting the relationship between the output signal and the pressure using a value of the output signal as the first value of the output signal and a pressure obtained from the second pressure sensor as the first pressure, when the pressure obtained from the first pressure sensor is equal to or lower than a predetermined pressure and a pressure downstream of the pressure reducing valve is equal to a pressure upstream of the pressure reducing valve, the pressure downstream of the pressure reducing valve being a pressure of the gas that has passed through the pressure reducing valve, and the pressure upstream of the pressure reducing valve being a pressure of the gas that has not passed through the pressure reducing valve.

* * * * *